March 4, 1924.
C. K. FREER
1,486,083
DEVICE FOR DRIVING FISHES
Filed Jan. 27, 1923
Fig. 1.
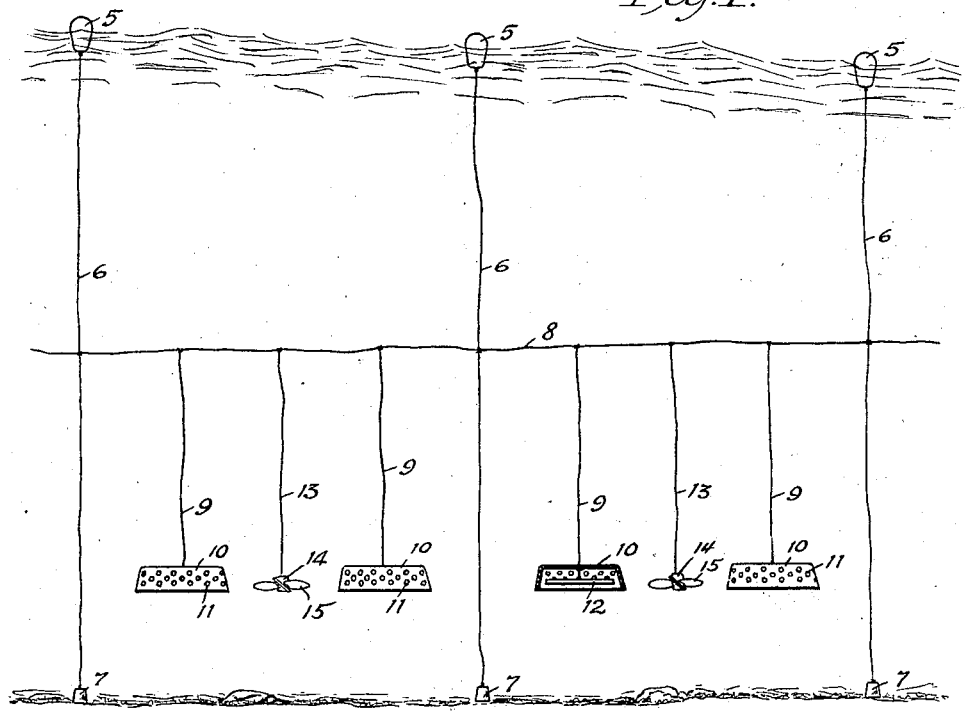
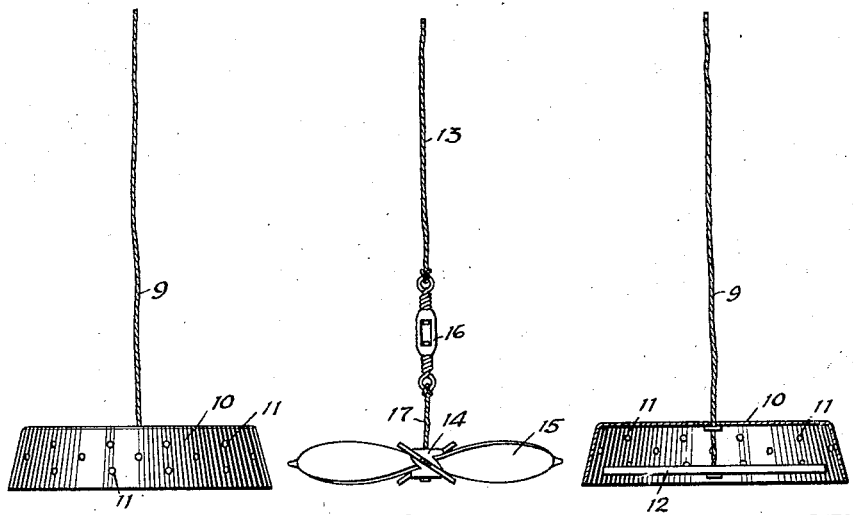
Fig. 2.
WITNESSES
INVENTOR
C. K. FREER
BY
ATTORNEYS Patented Mar. 4, 1924.

1,486,083

UNITED STATES PATENT OFFICE.

CHARLES KAATER FREER, OF LA CROSSE, WISCONSIN.

DEVICE FOR DRIVING FISHES.

Application filed January 27, 1923. Serial No. 615,382.

*To all whom it may concern:*

Be it known that I, CHARLES K. FREER, a citizen of the United States, and a resident of La Crosse, in the county of La Crosse and State of Wisconsin, have invented a new and Improved Device for Driving Fishes, of which the following is a full, clear, and exact description.

The present invention relates to new and useful improvements in devices for driving fishes, and it pertains more particularly to an improvement over the construction shown and described in my prior United States Letters Patent No. 978,872, granted December 20, 1910.

It is one of the objects of the invention to provide means adapted to be submerged in the body of water being fished to drive the fishes in a predetermined direction or along a predetermined path.

It is a further object of the invention to provide means for producing sound while submerged in the water in order to scare the fishes and cause the movement thereof in the desired direction.

It is a further object of the invention to provide visual means for frightening the fishes in order to cause their movement in the desired direction.

It is a still further object of the invention to construct these audible and visual devices so that they will be operated by their movement through the body of water being fished.

It is to be understood that while it is not so shown, the present device is adapted to be used in connection with a net or other trapping device in a manner similar to that described in my prior patent above mentioned.

With the above and other objects in view, reference is had to the accompanying drawings, in which—

Figure 1 is a schematic view showing the manner in which the device is used;

Figure 2 is a disassembled view, partly in section, showing the construction of the audible and visual devices for frightening the fishes.

Referring more particularly to the drawings, the reference numeral 5 designates a buoy, of which there are a plurality used, and depending from each of such buoys is a line or cable 6, to the lower end of each of which is secured a weight or sinker 7. Connected to each of the lines or cables 6, and extending at substantially right angles thereto, is a line or cable 8, and such line or cable 8 is secured to the lines or cables 6 at a point substantially midway between their ends. Secured to the line or cable 8 between the lines or cables 6, is a plurality of depending lines or cables 9, and secured to the lower end of each of these last-mentioned lines or cables 9 is an inverted pan-shaped member 10. As more clearly shown in Fig. 2, these pan-shaped members 10 are provided with a plurality of perforations 11 formed in their side walls. These members may, however, have perforations 11 in their bottom wall as well as in the side walls, if desired. Mounted within each of the inverted pan-shaped members 10 and suspended therein by means of the line or cable 9, is a vibrating member 12 of smaller diameter than the internal diameter of the pan-shaped members 10.

Secured to the line or cable 8 between the lines or cables 9, are lines or cables 13, and secured to the lower end of the lines or cables 13 is a whirling or oscillating member in the form of a propeller 14 having blades 15. This propeller is mounted either by means of a swivel 16 and a short length of cable 17, or the short length of cable 17 may be substituted by a rigid member about which the propeller 14 is free to revolve.

The device is adapted to operate in the following manner:

Lines are attached to the line or cable 8 and said lines are secured at their other end to a boat or boats, or in any other manner, and the device is dragged through the water in the same manner as described and shown in my Letters Patent above mentioned. As the device is moved through the water, the propeller 14 revolves or oscillates and serves to frighten the fishes and cause them to move in front. In addition to the revolving propeller, the water will enter the openings 11 in the side walls of the members 10 and will cause a movement of the vibrating member. As this member 12 vibrates its edge will strike the side walls of the pan-like members 10 and will produce a noise which also serves to frighten the fishes and cause a movement of the fishes in front of the device.

From the foregoing it is apparent that as the device is dragged through the water, the fishes will be driven before it, and, therefore, may be compelled to take a predetermined path dependent upon the direction of movement of the device through the water.

What is claimed is:

1. A device of the character described comprising a plurality of buoys, a line depending from each of said buoys, a line arranged at right angles to said first-mentioned lines and secured thereto, a plurality of sound-producing devices suspending from said second-mentioned line, and a rotating device carried by said second-mentioned line and adapted to be operated by movement thereof through the water.

2. A device of the character described comprising a plurality of buoys, a line depending from each of said buoys and provided on its lower end with a weight, a second line secured to said first-mentioned lines at a point between the buoy and the weight, a plurality of noise-producing devices suspended from said second-mentioned line and in spaced relation to each other, and a whirling device suspended from said second-mentioned line and interposed between two of said noise-producing devices.

3. In a device of the character described, a plurality of buoys, a line depending from each of said buoys and provided on its lower end with a weight, a second line connected to said first-mentioned lines at a point between the buoy and the weight thereof, a plurality of whirling devices suspended from said second-mentioned line, and a plurality of sound-producing devices suspended from said second-mentioned line, said sound-producing devices being operable by action of movement thereof through the water.

4. A subaqueous alarm comprising a substantially hollow, perforated member, and a disk suspended within said hollow member in such a manner that water will pass through the perforations of said hollow member and vibrate the disk and cause it to contact with the hollow member to produce sound.

CHARLES KAATER FREER.